United States Patent [19]
Witte et al.

[11] Patent Number: 5,777,915
[45] Date of Patent: Jul. 7, 1998

[54] MULTIPLIER APPARATUS AND METHOD FOR REAL OR COMPLEX NUMBERS

[75] Inventors: Franz-Otto Witte; Markus Klumpp, both of Emmendingen, Germany

[73] Assignee: Deutsche ITT Industries GmbH, Freiburg, Germany

[21] Appl. No.: 247,320

[22] Filed: May 23, 1994

[30] Foreign Application Priority Data

May 21, 1993 [DE] Germany .................. 43 17 074.9

[51] Int. Cl.$^6$ .................................. G06F 7/52
[52] U.S. Cl. .................. 364/754.01; 364/754.03; 364/760.01
[58] Field of Search .................. 364/736, 754–760

[56] References Cited

U.S. PATENT DOCUMENTS

| | | | |
|---|---|---|---|
| 4,680,727 | 7/1987 | White | 364/754 |
| 4,754,421 | 6/1988 | Bosshart | 364/757 |
| 4,769,779 | 9/1988 | Chang et al. | 364/754 |
| 4,825,401 | 4/1989 | Ikumi | 364/760 |
| 4,829,460 | 5/1989 | Ito | 364/715.08 |
| 5,262,976 | 11/1993 | Young et al. | 364/760 |
| 5,442,799 | 8/1995 | Murakami et al. | 364/758 X |

FOREIGN PATENT DOCUMENTS

2913327C2   4/1986   Germany.

OTHER PUBLICATIONS

High Speed Signed Binary Multiplication, IBM Technical Bulletin, vol. 25, No. 7A, Dec. 1982.
Introduction to Arithmetic for Digital Designers, Waser and Flynn; Holt, Rinehart and Winston, 1982.
Computer Arithmetic, Principles, Architecture and Architecture, Hwang; John Wiley & Sons, 1979.

*Primary Examiner*—Chuong Dinh Ngo
*Attorney, Agent, or Firm*—Plevy & Associates

[57] ABSTRACT

A multiplier for real or complex numbers is split at each data input into two equally large digit ranges to determine partial products in separate subfields. Within a rectangular partial-product field, the subfields are rearranged according to the real or complex arithmetic operation to be performed, the rearrangement being effected by assigning basic weights to the individual subfields. By means of an adding arrangement, the partial products of the individuals subfields are added in a positionally correct manner to form the digits of a real or complex output number.

22 Claims, 8 Drawing Sheets

| R | X | 2X | Xz | 2Xz | p1₁₆ | p1₁₅ | p1₁₄ | p1₁₃ | p1₁₂ | p1₁₁ | p1₁₀ | p1₉ | p1₈ | p1₇ | p1₆ | p1₅ | p1₄ | p1₃ | p1₂ | p1₁ | p1c |
|---|---|----|----|-----|------|------|------|------|------|------|------|-----|-----|-----|-----|-----|-----|-----|-----|-----|-----|
| R | 0 | 0  | 0  | 0   | 0    | 0    | 0    | 0    | 0    | 0    | 0    | 0   | 0   | 0   | 0   | 0   | 0   | 0   | 0   | 0   | 0   |
| R | 1 | 0  | 0  | 0   | $X_7$ | $X_7$ | $X_7$ | $X_7$ | $X_7$ | $X_7$ | $X_7$ | $X_7$ | $X_7$ | $X_6$ | $X_5$ | $X_4$ | $X_3$ | $X_2$ | $X_1$ | $X_0$ | 0   |
| R | 0 | 1  | 0  | 0   | $X_7$ | $X_7$ | $X_7$ | $X_7$ | $X_7$ | $X_7$ | $X_7$ | $X_7$ | $X_6$ | $X_5$ | $X_4$ | $X_3$ | $X_2$ | $X_1$ | $X_0$ | 0   | 0   |
| R | 0 | 0  | 1  | 0   | $\overline{X_7}$ | $\overline{X_7}$ | $\overline{X_7}$ | $\overline{X_7}$ | $\overline{X_7}$ | $\overline{X_7}$ | $\overline{X_7}$ | $\overline{X_7}$ | $\overline{X_7}$ | $\overline{X_6}$ | $\overline{X_5}$ | $\overline{X_4}$ | $\overline{X_3}$ | $\overline{X_2}$ | $\overline{X_1}$ | $\overline{X_0}$ | 1   |
| R | 0 | 0  | 0  | 1   | $\overline{X_7}$ | $\overline{X_7}$ | $\overline{X_7}$ | $\overline{X_7}$ | $\overline{X_7}$ | $\overline{X_7}$ | $\overline{X_7}$ | $\overline{X_7}$ | $\overline{X_6}$ | $\overline{X_5}$ | $\overline{X_4}$ | $\overline{X_3}$ | $\overline{X_2}$ | $\overline{X_1}$ | $\overline{X_0}$ | 1   | 1   |

Fig. 14

| K | X | 2X | Xz | 2Xz | p1₁₆ | p1₁₅ | p1₁₄ | p1₁₃ | p1₁₂ | p1₁₁ | p1₁₀ | p1₉ | p1₈ | p1₇ | p1₆ | p1₅ | p1₄ | p1₃ | p1₂ | p1₁ | p1₉CH | p1₁CL |
|---|---|----|----|-----|------|------|------|------|------|------|------|-----|-----|-----|-----|-----|-----|-----|-----|-----|-------|-------|
| K | 0 | 0  | 0  | 0   | 0    | 0    | 0    | 0    | 0    | 0    | 0    | 0   | 0   | 0   | 0   | 0   | 0   | 0   | 0   | 0   | 0     | 0     |
| K | 1 | 0  | 0  | 0   | $\overline{X_3}$ | $\overline{X_3}$ | $\overline{X_3}$ | $\overline{X_3}$ | $\overline{X_2}$ | $\overline{X_1}$ | $\overline{X_0}$ | $\overline{X_7}$ | $\overline{X_7}$ | $X_7$ | $X_7$ | $X_7$ | $X_6$ | $X_5$ | $X_4$ | 0   | 1     | 0     |
| K | 0 | 1  | 0  | 0   | $\overline{X_3}$ | $\overline{X_3}$ | $\overline{X_3}$ | $\overline{X_3}$ | $\overline{X_2}$ | $\overline{X_1}$ | $\overline{X_0}$ | 1   | $X_7$ | $X_7$ | $X_7$ | $X_7$ | $X_7$ | $X_6$ | $X_5$ | $X_4$ | 1     | 0     |
| K | 0 | 0  | 1  | 0   | $X_3$ | $X_3$ | $X_3$ | $X_3$ | $X_3$ | $X_2$ | $X_1$ | $X_0$ | $\overline{X_7}$ | $\overline{X_7}$ | $\overline{X_7}$ | $\overline{X_7}$ | $\overline{X_6}$ | $\overline{X_5}$ | $\overline{X_4}$ | 0   | 0     | 1     |
| K | 0 | 0  | 0  | 1   | $X_3$ | $X_3$ | $X_3$ | $X_3$ | $X_2$ | $X_1$ | $X_0$ | 0   | $\overline{X_7}$ | $\overline{X_7}$ | $\overline{X_7}$ | $\overline{X_7}$ | $\overline{X_7}$ | $\overline{X_6}$ | $\overline{X_5}$ | 1   | 0     | 1     |

Fig. 15

| | X | 2X | XZ | 2XZ | p2₁₆ | p2₁₅ | p2₁₄ | p2₁₃ | p2₁₂ | p2₁₁ | p2₁₀ | p2₉ | p2₈ | p2₇ | p2₆ | p2₅ | p2₄ | p2₃ | p2₂ | p2₁ | p2₃ᵣ |
|---|---|---|---|---|---|---|---|---|---|---|---|---|---|---|---|---|---|---|---|---|---|
| R | 0 | 0 | 0 | 0 | 0 | 0 | 0 | 0 | 0 | 0 | 0 | 0 | 0 | 0 | 0 | 0 | 0 | 0 | 0 | 0 | 0 |
| R | 1 | 0 | 0 | 0 | $X_7$ | $X_7$ | $X_7$ | $X_7$ | $X_7$ | $X_7$ | $X_7$ | $X_6$ | $X_5$ | $X_4$ | $X_3$ | $X_2$ | $X_1$ | $X_0$ | 0 | 0 | 0 |
| R | 0 | 1 | 0 | 0 | $X_7$ | $X_7$ | $X_7$ | $X_7$ | $X_7$ | $X_7$ | $X_6$ | $X_5$ | $X_4$ | $X_3$ | $X_2$ | $X_1$ | $X_0$ | 0 | 0 | 0 | 0 |
| R | 0 | 0 | 1 | 0 | $\bar{X}_7$ | $\bar{X}_7$ | $\bar{X}_7$ | $\bar{X}_7$ | $\bar{X}_7$ | $\bar{X}_7$ | $\bar{X}_7$ | $\bar{X}_6$ | $\bar{X}_5$ | $\bar{X}_4$ | $\bar{X}_3$ | $\bar{X}_2$ | $\bar{X}_1$ | $\bar{X}_0$ | 0 | 0 | 1 |
| R | 0 | 0 | 0 | 1 | $\bar{X}_7$ | $\bar{X}_7$ | $\bar{X}_7$ | $\bar{X}_7$ | $\bar{X}_7$ | $\bar{X}_7$ | $\bar{X}_6$ | $\bar{X}_5$ | $\bar{X}_4$ | $\bar{X}_3$ | $\bar{X}_2$ | $\bar{X}_1$ | $\bar{X}_0$ | 1 | 0 | 0 | 1 |

Fig. 16

| | X | 2X | XZ | 2XZ | p2₁₆ | p2₁₅ | p2₁₄ | p2₁₃ | p2₁₂ | p2₁₁ | p2₁₀ | p2₉ | p2₈ | p2₇ | p2₆ | p2₅ | p2₄ | p2₃ | p2₂ | p2₁ | p2₁₁CH | p2₃CL |
|---|---|---|---|---|---|---|---|---|---|---|---|---|---|---|---|---|---|---|---|---|---|---|
| K | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| K | 1 | 0 | 0 | 0 | $\bar{X}_3$ | $\bar{X}_3$ | $\bar{X}_3$ | $\bar{X}_2$ | $\bar{X}_1$ | $\bar{X}_0$ | 0 | $X_7$ | $X_7$ | $X_7$ | $X_7$ | $X_6$ | $X_5$ | $X_4$ | 0 | 0 | 1 | 0 |
| K | 0 | 1 | 0 | 0 | $\bar{X}_3$ | $\bar{X}_3$ | $\bar{X}_2$ | $\bar{X}_1$ | $\bar{X}_0$ | 1 | 0 | $X_7$ | $X_7$ | $X_7$ | $X_6$ | $X_5$ | $X_4$ | 0 | 0 | 0 | 1 | 0 |
| K | 0 | 0 | 1 | 0 | $X_3$ | $X_3$ | $X_2$ | $X_1$ | $X_0$ | $\bar{X}_0$ | 1 | $\bar{X}_7$ | $\bar{X}_7$ | $\bar{X}_7$ | $\bar{X}_7$ | $\bar{X}_6$ | $\bar{X}_5$ | $\bar{X}_4$ | 0 | 0 | 0 | 1 |
| K | 0 | 0 | 0 | 1 | $X_3$ | $X_2$ | $X_1$ | $X_0$ | $\bar{X}_0$ | 0 | $X_0$ | $\bar{X}_7$ | $\bar{X}_7$ | $\bar{X}_7$ | $\bar{X}_6$ | $\bar{X}_5$ | $\bar{X}_4$ | 1 | 0 | 0 | 0 | 1 |

| | X | 2X | X₇ | 2X₇ | p3₁₆ | p3₁₅ | p3₁₄ | p3₁₃ | p3₁₂ | p3₁₁ | p3₁₀ | p3₉ | p3₈ | p3₇ | p3₆ | p3₅ | p3₄ | p3₃ | p3₂ | p3₁ | p3₅c |
|---|---|---|---|---|---|---|---|---|---|---|---|---|---|---|---|---|---|---|---|---|---|
| R | 0 | 0 | 0 | 0 | 0 | 0 | 0 | 0 | 0 | 0 | 0 | 0 | 0 | 0 | 0 | 0 | 0 | 0 | 0 | 0 | 0 |
| R | 1 | 0 | 0 | 0 | X₇ | X₇ | X₇ | X₇ | X₇ | X₆ | X₅ | X₄ | X₃ | X₂ | X₁ | X₀ | 0 | 0 | 0 | 0 | 0 |
| R | 0 | 1 | 0 | 0 | X₇ | X₇ | X₇ | X₇ | X₆ | X₅ | X₄ | X₃ | X₂ | X₁ | X₀ | 0 | 0 | 0 | 0 | 0 | 0 |
| R | 0 | 0 | 1 | 0 | X̄₇ | X̄₇ | X̄₇ | X̄₇ | X̄₇ | X̄₆ | X̄₅ | X̄₄ | X̄₃ | X̄₂ | X̄₁ | X̄₀ | 0 | 0 | 0 | 0 | 1 |
| R | 0 | 0 | 0 | 1 | X̄₇ | X̄₇ | X̄₇ | X̄₇ | X̄₆ | X̄₅ | X̄₄ | X̄₃ | X̄₂ | X̄₁ | X̄₀ | 1 | 0 | 0 | 0 | 0 | 1 |

Fig.17

| | X | 2X | X₇ | 2X₇ | p3₁₆ | p3₁₅ | p3₁₄ | p3₁₃ | p3₁₂ | p3₁₁ | p3₁₀ | p3₉ | p3₈ | p3₇ | p3₆ | p3₅ | p3₄ | p3₃ | p3₂ | p3₁ | p3₉cH p3₁cL |
|---|---|---|---|---|---|---|---|---|---|---|---|---|---|---|---|---|---|---|---|---|---|
| K | 0 | 0 | 0 | 0 | 0 | 0 | 0 | 0 | 0 | 0 | 0 | 0 | 0 | 0 | 0 | 0 | 0 | 0 | 0 | 0 | 0 |
| K | 1 | 0 | 0 | 0 | X₇ | X₇ | X₇ | X₇ | X₇ | X₆ | X₅ | X₄ | X₃ | X₃ | X₃ | X₃ | X₃ | X₂ | X₁ | X₀ | 0 |
| K | 0 | 1 | 0 | 0 | X₇ | X₇ | X₇ | X₇ | X₆ | X₅ | X₄ | X₃ | X₃ | X₃ | X₃ | X₃ | X₂ | X₁ | X₀ | 0 | 0 |
| K | 0 | 0 | 1 | 0 | X̄₇ | X̄₇ | X̄₇ | X̄₇ | X̄₇ | X̄₆ | X̄₅ | X̄₄ | X̄₃ | X̄₃ | X̄₃ | X̄₃ | X̄₃ | X̄₂ | X̄₁ | X̄₀ | 1 |
| K | 0 | 0 | 0 | 1 | X̄₇ | X̄₇ | X̄₇ | X̄₇ | X̄₆ | X̄₅ | X̄₄ | X̄₃ | X̄₃ | X̄₃ | X̄₃ | X̄₃ | X̄₂ | X̄₁ | X̄₀ | 1 | 1 |

| X | 2X | Xz | 2Xz | p4₁₆ | p4₁₅ | p4₁₄ | p4₁₃ | p4₁₂ | p4₁₁ | p4₁₀ | p4₉ | p4₈ | p4₇ | p4₆ | p4₅ | p4₄ | p4₃ | p4₂ | p4₁ | p4₇C | R |
|---|----|----|-----|------|------|------|------|------|------|------|-----|-----|-----|-----|-----|-----|-----|-----|-----|------|---|
| 0 | 0  | 0  | 0   | 0    | 0    | 0    | 0    | 0    | 0    | 0    | 0   | 0   | 0   | 0   | 0   | 0   | 0   | 0   | 0   | 0    | R |
| 1 | 0  | 0  | 0   | $X_7$ | $X_7$ | $X_7$ | $X_6$ | $X_5$ | $X_4$ | $X_3$ | $X_2$ | $X_1$ | $X_0$ | 0 | 0 | 0 | 0 | 0 | 0 | 0 | R |
| 0 | 1  | 0  | 0   | $X_7$ | $X_7$ | $X_6$ | $X_5$ | $X_4$ | $X_3$ | $X_2$ | $X_1$ | $X_0$ | 0   | 0 | 0 | 0 | 0 | 0 | 0 | 0 | R |
| 0 | 0  | 1  | 0   | $\bar{X}_7$ | $\bar{X}_7$ | $\bar{X}_7$ | $\bar{X}_6$ | $\bar{X}_5$ | $\bar{X}_4$ | $\bar{X}_3$ | $\bar{X}_2$ | $\bar{X}_1$ | $\bar{X}_0$ | 0 | 0 | 0 | 0 | 0 | 0 | 1 | R |
| 0 | 0  | 0  | 1   | $\bar{X}_7$ | $\bar{X}_7$ | $\bar{X}_6$ | $\bar{X}_5$ | $\bar{X}_4$ | $\bar{X}_3$ | $\bar{X}_2$ | $\bar{X}_1$ | $\bar{X}_0$ | 1   | 0 | 0 | 0 | 0 | 0 | 0 | 1 | R |

Fig.20

| X | 2X | Xz | 2Xz | p4₁₆ | p4₁₅ | p4₁₄ | p4₁₃ | p4₁₂ | p4₁₁ | p4₁₀ | p4₉ | p4₈ | p4₇ | p4₆ | p4₅ | p4₄ | p4₃ | p4₂ | p4₁ | p4₁CH p4₃CL | K |
|---|----|----|-----|------|------|------|------|------|------|------|-----|-----|-----|-----|-----|-----|-----|-----|-----|-------------|---|
| 0 | 0  | 0  | 0   | 0    | 0    | 0    | 0    | 0    | 0    | 0    | 0   | 0   | 0   | 0   | 0   | 0   | 0   | 0   | 0   | 0 | K |
| 1 | 0  | 0  | 0   | $X_7$ | $X_7$ | $X_7$ | $X_6$ | $X_5$ | $X_4$ | 0 | 0 | $X_3$ | $X_3$ | $X_3$ | $X_2$ | $X_1$ | $X_0$ | 0 | 0 | 0 | K |
| 0 | 1  | 0  | 0   | $X_7$ | $X_7$ | $X_6$ | $X_5$ | $X_4$ | 0 | 0 | $X_3$ | $X_3$ | $X_3$ | $X_2$ | $X_1$ | $X_0$ | 0 | 0 | 0 | 0 | K |
| 0 | 0  | 1  | 0   | $\bar{X}_7$ | $\bar{X}_7$ | $\bar{X}_7$ | $\bar{X}_6$ | $\bar{X}_5$ | $\bar{X}_4$ | 0 | 1 | $\bar{X}_3$ | $\bar{X}_3$ | $\bar{X}_3$ | $\bar{X}_2$ | $\bar{X}_1$ | $\bar{X}_0$ | 0 | 0 | 1 | K |
| 0 | 0  | 0  | 1   | $\bar{X}_7$ | $\bar{X}_7$ | $\bar{X}_6$ | $\bar{X}_5$ | $\bar{X}_4$ | 0 | 1 | $\bar{X}_3$ | $\bar{X}_3$ | $\bar{X}_3$ | $\bar{X}_2$ | $\bar{X}_1$ | $\bar{X}_0$ | 0 | 0 | 0 | 1 | K |

MULTIPLIER APPARATUS AND METHOD FOR REAL OR COMPLEX NUMBERS

FIELD OF THE INVENTION

The present invention relates to a multiplier for real or complex numbers comprising a multiplying device for forming partial products from a first 2m-digit number and a second 2m-digit number which are fed into the multiplier through first and second data inputs and whose product is provided as a third number at a 4m-digit data output, where m is an integer greater than or equal to 1.

BACKGROUND OF THE INVENTION

Multipliers, particularly multipliers forming part of monolithic integrated signal processors, are increasingly being used for digitally processing audio and video signals, e.g., for demodulating frequency or phase-modulated signals, which may also be present in quadrature-modulated form. Conventional standard multipliers are generally highly flexible and adaptable to many tasks via their operating program. For direct signal processing, however, they are usable only if the signal frequency to be processed is much lower than the computation rate, which is limited by the cycle time of the operating program, the necessary accuracy being determined by the number of bits of the multiplier. Acceleration, as is well known, is achieved by parallel processing. In the case of multidigit numbers, parallel calculation of the individual partial-product rows and parallel addition of the individual partial products are appropriate. The parallel processing of entire data rows during a single sampling clock period is also referred to as "pipelining."

A further increase in speed is possible if the parallel processing relates to more than a single data row, which is achieved by means of an array multiplier. In a limiting case, all partial products are calculated and all additions are performed during a single clock period. Examples of standard and parallel multipliers are described in detail in elementary books by Kai Hwang, "Computer Arithmetic", "Principles, Architecture and Design", J. Wiley & Sons, New York, 1979, or Shlomo Waser and Michael J. Flynn, "Introduction to Arithmetic for Digital Systems Designers", Holt, Rinehart and Winston, New York, 1982.

It is apparent that the amount of circuitry and wiring required with the pipelining or array technique is so large that parallel multipliers, unlike universal standard multipliers, which generally perform the multiplication serially via an ALU (arithmetic logic unit), have fixed application and hardly permit different modes of operation. In monolithic integrated circuits, the electronic switches or intermediate stages that would be necessary for greater flexibility increase the amount of area required by the multiplier and reduce the attainable computing speed because of the longer signal propagation delays and greater loads.

In some signal processors, particularly for the audio-signal range, multipliers are necessary for a first mode of multiplication which, because of the accuracy required, have a high number of digits and permit for example, the multiplication of two 20-digit binary numbers to form a 40-digit binary number. However, such multipliers are to be also suitable for a second mode of multiplication, particularly for channel demodulation, in which two complex numbers have to be multiplied, with the respective real and imaginary parts each consisting of a 10-digit binary number. The complex number then has 20 binary digits both in real part and in the imaginary part. In the following, instead of "binary digit," the shorter term "digit" will mostly be used. The multiplication of two complex numbers is a frequently occurring arithmetic operation. It occurs, for example, in the rotation of a complex vector or in standard routines, such as the FFT (Fast Fourier Transform).

It is, therefore, the object of the invention as claimed to provide a multiplier which permits simple multiplication of both real and complex numbers and has a high computing speed.

SUMMARY OF THE INVENTION

The invention is predicated on recognition that for real and complex-number multiplications, the same partial products have to be formed and the differences lie only in the weight and in the addition of the individual partial products. The weight can be changed by means of an arithmetic shift. In the case of binary numbers, a shift number n corresponds to a multiplication or division by the nth power of two. According to the invention, the input data is divided into two digit ranges, and four separate group multiplications are performed with the individual digit ranges. The partial products of each of these four groups are assigned a given weight, henceforth called "basic weight." The basic weight corresponds to a common group shift of all partial products of this group. Within the group, the weight of the individual partial products, which follows directly from the multiplication of the two digit ranges, remains. This applies to any number system, not only to binary numbers.

In the following, "partial product" means the result obtained by multiplying a single digit of the multiplicand (e.g., a binary digit) by a single digit of the multiplier (e.g., also a binary digit). The partial product is thus the smallest multiplication unit in the product formation. A partial-product row contains all partial products obtained by multiplying a single digit of the multiplicand or multiplier by all digits of the multiplier or multiplicand, respectively. All partial-product rows form a partial-product field. The partial product field can be divided into individual partial-product groups.

With binary numbers, which are mostly used, the individual weight of each digit range begins with the lowest weight $2^0$. Assuming a 20-digit binary number a, the individual weight of each of the two digit ranges a0 and a1 runs from $2^0$ to $2^9$. Analogously, a second 20-digit binary number b is split into the two digit ranges b0 and b1. By a0 and b0 are meant the lower-value digit ranges of the first and second binary numbers a and b, respectively. A resulting weight for the individual partial product is given by the product of individual weight and associated basic weight.

With the above-defined digit ranges, the real-number multiplication $a \cdot b$ is represented as follows, the basic shift of each partial-product group being defined by the weight factors $2^0$, $2^{10}$ and $2^{20}$, respectively:

$$a \cdot b = a1 \cdot b1 \cdot 2^{20} + (a1 \cdot b0 + a0 \cdot b1) \cdot 2^{10} + a0 \cdot b0 \cdot 2^0$$

In a complex number multiplication, the real number of a first complex number $a1 + ja0$ is assigned to the digit range a1, and the imaginary number to the digit range a0. A second complex number $b1 + jb0$ is defined in a similar manner. The complex-number multiplication is thus represented as follows:

$$(a1 + ja0)(b1 + jb0) = (a1 \cdot b1 - a0 \cdot b0) \cdot 2^0 + j(a1 \cdot b0 + a0 b1) \cdot 2^0$$

A comparison between the two multiplications shows that in both cases the following four partial-product groups are formed:

a1·b1, a0·b0, a1·b0, a0·b1

The two multiplications only differ by a rearrangement of the individual partial-product groups, with the partial-product group a0·b0 being subtracted or being negated prior to the addition. The rearrangement must be regarded as a change in the weight, and thus as a basic shift, of the respective partial-product group.

The division of the numbers to be multiplied into two ranges of digits can be made in an arbitrary manner if it is ensured that the associated partial products are assigned the correct, individual weight. For simplicity, a division is assumed in the following in which all digits are arranged according to ascending weights. To clearly distinguish between the position and content of a binary digit in a multidigit binary number, a distinction will occasionally be made between bit position and bit value.

BRIEF DESCRIPTION OF THE DRAWINGS

The invention will now be explained in more detail with reference to the accompanying drawings, in which.

DETAILED DESCRIPTION OF THE DRAWINGS

Figure 1:
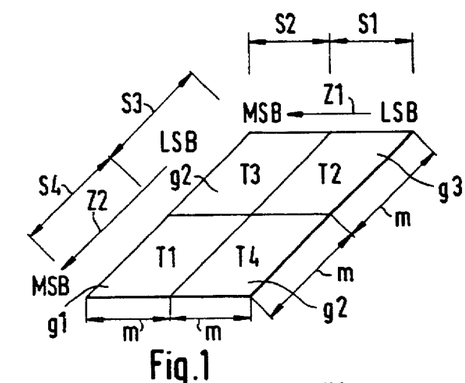
FIGS. 1 and 2 show schematically a trapezoidal partial-product field formed in case of a multiplication of two multidigit real numbers.
Figure 2:
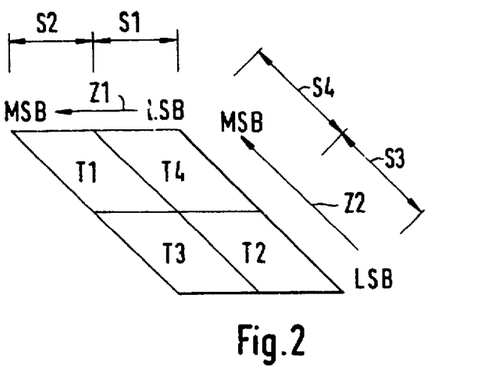

FIG. 1 shows schematically a trapezoidal partial-product field formed for the multiplication of a first number Z1 by a second number Z2, which are 2m-digit numbers, generally binary numbers. The inclination of the trapezoidal partial-product field is determined by the multiplication sequence with which the individual partial product rows are formed. In FIGS. 1 and 2, this is illustrated schematically by the different orientation—(see arrow)—of the second number Z2.

The trapezoidal arrangement of the partial-product fields remains the same if the 2m digits of the first and second numbers are divided into two m-digit ranges. The first number Z1 is divided, in ascending significance, into a first digit range S1 and a second digit range S2, and the second number Z2 into a third digit range S3 and a fourth digit range S4. The partial-product field is thus divided into four equally large, likewise trapezoidal subfields. The partial products of the second and fourth digit ranges S2, S4 form a first subfield T1, the partial products of the first and third digit ranges S1, S3 form a second subfield T2, the partial products of the second and third digit ranges S2, S3 form a third subfield T3, and the partial products of the first and fourth digit ranges S1, S4 form a fourth subfield T4.

The result of the multiplication, namely the individual digits of a third number Z3, is obtained by adding the individual partial products in a positionally correct manner. In the trapezoidal representation of FIGS. 1 and 2, these are the partial products of the entire partial-product field which lie vertically one above another. Starting from the subfields, which must be regarded as isolated units, each subfield in the case of binary numbers, begins right-justified with the individual weight $2^0$ and ends left-justified with the individual weight $2^{2m-1}$. In order that the individual subfields are added correctly, each subfield must be assigned a particular basic weight which, together with the individual weight for each partial product, gives a resulting weight g. From all the resulting weights g, the whole trapezoidal partial-product field must be reconstructible. In FIGS. 1 and 2, the subfield T1 comprises the weights from $2^0$ to $2^{2m-1}$. The subfield T2 is assigned a third basic weight g3, which has the value $2^0$. The subfields T3 and T4 comprise the weights $2^m$ to $2^{3m-1}$ in the trapezoidal partial-product field. The subfields T3 and T4 are assigned a second basic weight g2 with the value $2^m$. The first subfield T1, which comprises the weights $2^{2m}$ to $2^{4m-1}$ in the trapezoidal partial-product field, is assigned a first basic weight g1 with the value $2^{2m}$.

The trapezoidal arrangement of the entire partial-product field and of the subfields may relate directly to a practical embodiment, e.g., in a matrix memory. The arrangement of the partial products may also be only an imaginary one, because the partial products can be stored in an addressable memory by means of arbitrary addresses.

Figure 3:
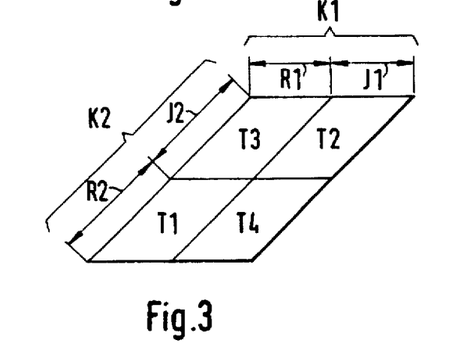
FIGS. 3 and 4 show the partial-product fields of FIGS. 1 and 2, but with two complex numbers formally assigned to those fields.
Figure 4:
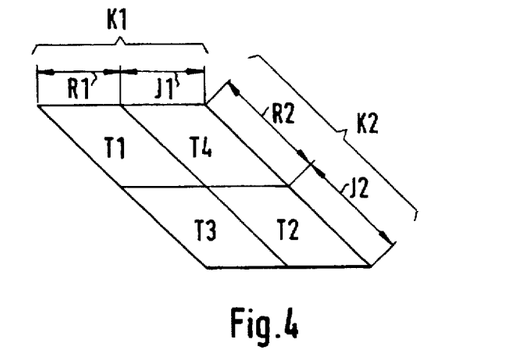

FIGS. 3 and 4 again show the trapezoidal partial-product field of FIGS. 1 and 2 with the four subfields. Instead of the first and second numbers Z1, Z2, a first complex number K1=R1+jI1 and a second complex number K2=R2+jI2 are formally assigned to the partial-product field. A first imaginary number I1 is assigned to the first digit range S1, a first real number R1 to the second digit range S2, a second imaginary number I2 to the third digit range S3, and a second real number R2 to the fourth digit range S4. The subfields T1, T2 contain the real components R3 of a third complex number K3=R3+jI3, and the subfields T3, T4 contain the imaginary components I3 of that complex number. An addition according to the scheme of FIG. 1 or FIG. 2, however, would lead to a wrong result for the complex number K3, because the above addition scheme is not admissible; for example, real and imaginary components would be partly added. The complex-number multiplication therefore necessitates rearranging the subfields as shown by way of example in FIG. 5 or FIG. 6.

Figure 5:
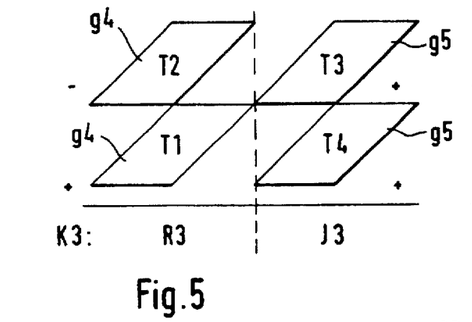
FIGS. 5 and 6 show the rearrangement required in the case of complex numbers within an extended partial-product field.
Figure 6:
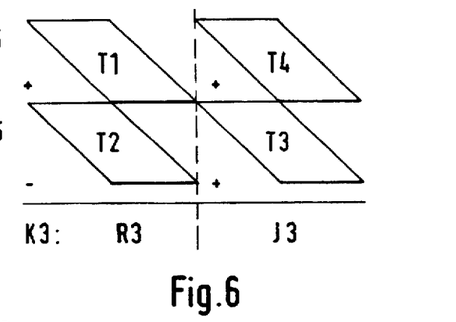

In FIGS. 5 and 6, all subfields are rearranged except the first subfield T1, so that the addition of the individual partial products is strictly separated according to real part and imaginary part. In the rearrangement illustrated in FIGS. 5 and 6, the right-hand side and left-hand side may also be interchanged; this only involves a change of the associated basic weights. In FIGS. 5 and 6, the two left-hand subfields T1, T2 are assigned a fourth basic weight g4 with the value $2^{2m}$. The two right-hand subfields T3, T4 are assigned a fifth basic weight g5 with the value $2^0$. The subtraction of the second subfield T2 from the first subfield T1 can be replaced by an addition if the second subfield T2 was previously negated. In the case of binary-coded binary numbers, the negation generally corresponds to the well-known two's complement formation.

Figure 7:
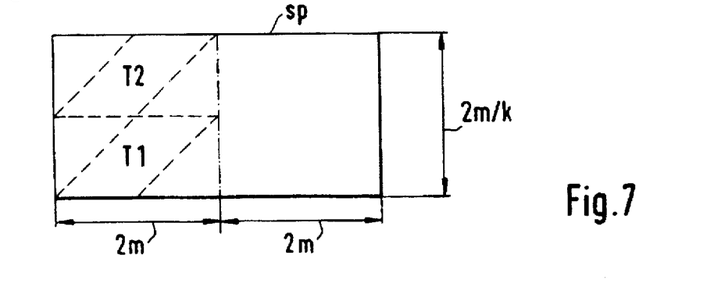
FIG. 7 shows a rectangular partial-product field.

The rearrangement of the subfields in a real or complex-number multiplication permits a rectangular partial-product field sp as shown in FIG. 7, which receives all partial products needed to determine all digits of the third number Z3 or the third complex number K3. This also includes the necessary digit extensions or digit increments in the MSB and LSB ranges of the partial-product rows. The rules for digit extension or digit supplementation follow from the number system used. The rectangular partial-product field sp comprises 4m digits in the horizontal direction and 2m rows in the vertical direction. The number of partial-product rows can be reduced by means of suitable multiplication algorithms. The modified Booth's algorithm illustrated in tabular form in FIG. 9 reduces the number of partial products by one half. The row-reduction factor k given in FIG. 7 is thus 2. With greater complexity, greater row reduction factors can be achieved.

Figure 8:
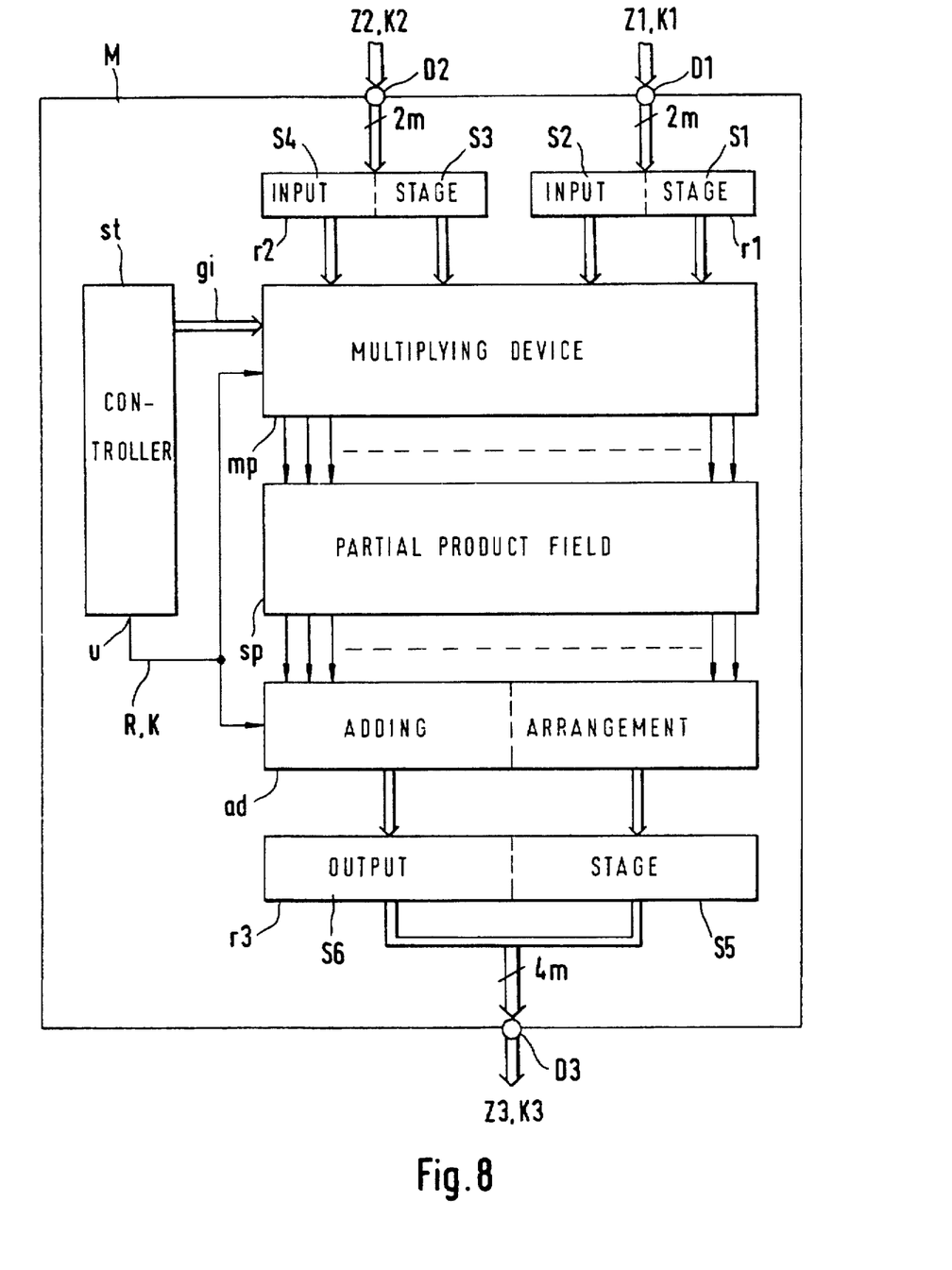
FIG. 8 is a block diagram of one embodiment

In FIG. 8, a multiplier M which is switchable in a simple manner between real and complex-number multiplication is shown in block-diagram form as one embodiment of the invention. A first, 2m-digit data input D1 is fed with the first number Z1 or the first complex number K1. A first input stage R1 serves to provide isolation or to buffer the input data. The latter are split by means of the first input stage r1 into two equally large ranges of digits, namely the m-digit first digit range S1 and the m-digit second digit range S2. Similarly, a second data input D2 for the second number Z2 or the second complex number K2 is connected to a second input stage r2 which divides the 2m digits of the input data into the m-digit third and fourth digit ranges S3, S4.

The individual digits of the four digit ranges S1 to S4 are fed to a multiplying device mp, which forms partial-products from the individual digits. This may be done row by row in parallel form, so that all partial products obtained by multiplying the digits of the first or second data input D1, D2 by a digit of the other data input are formed simultaneously. In the limiting case, the multiplying device mp will be so designed that all partial products can be formed simultaneously.

Figure 11:
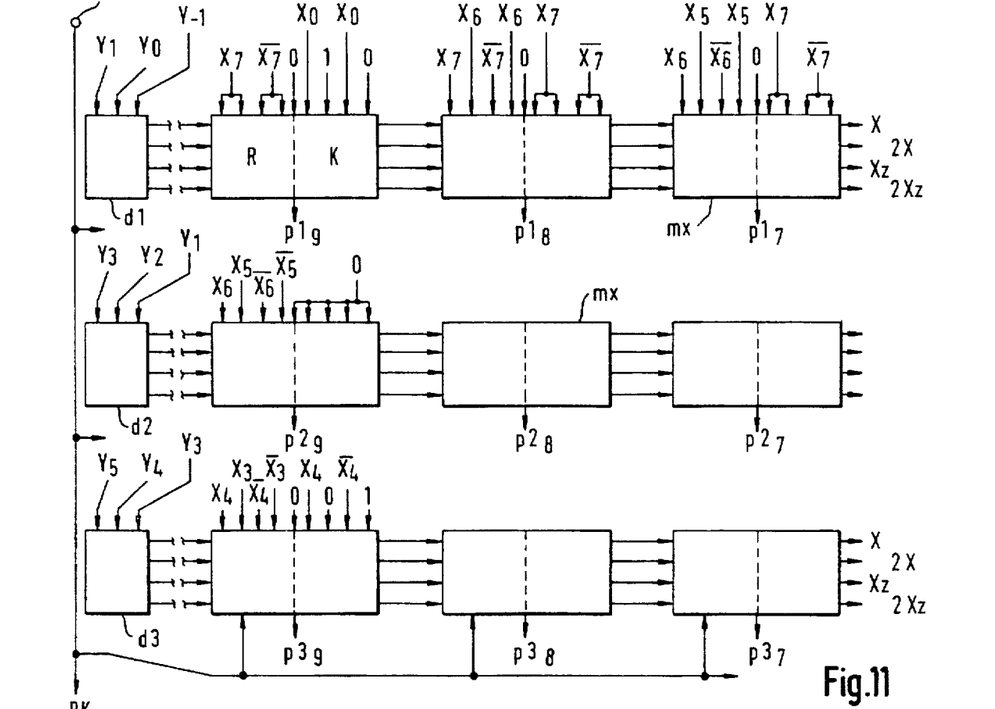
FIG. 11 shows schematically the formation of a partial product by means of a multiplexer.

The multiplying device mp is connected to a controller st which provides a switching signal R, K for the real or complex-number multiplication at a switching output u. The controller st also sets the necessary basic weights gi in the multiplying device. In the example of FIG. 11, each multiplexer mx is assigned two fixed weights, whose selection is activated by the switching signal R, K. Each of the permanently assigned weights corresponds to the resulting weight which is composed of the individual weight and the basic weight gi.

Figure 10:
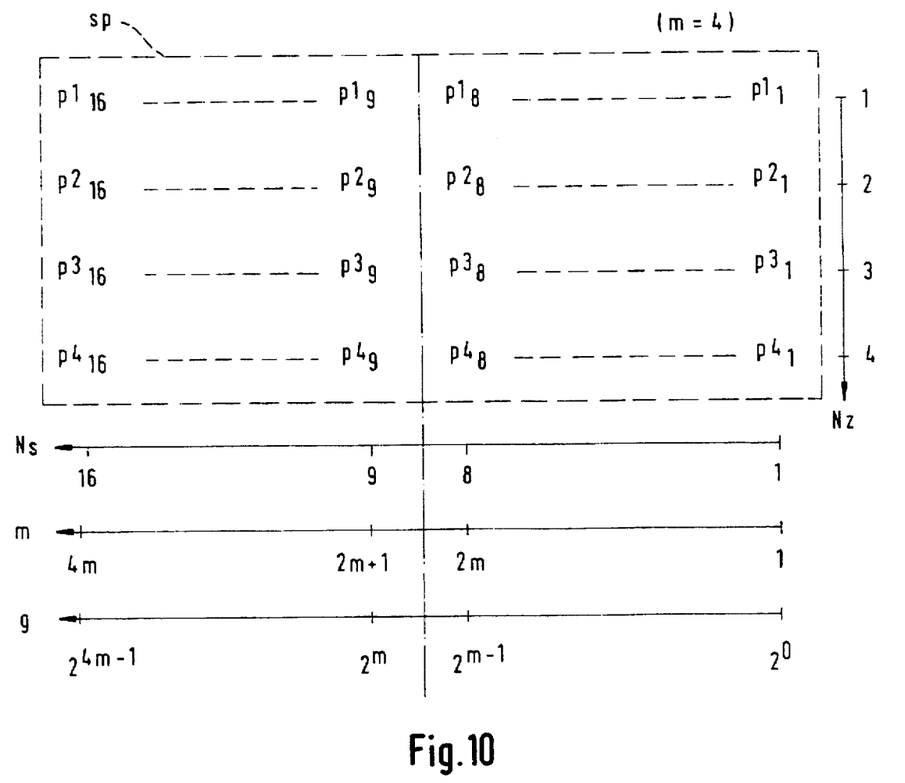
FIG. 10 shows schematically in tabular form the partial products in the rectangular partial-product field if two 8-digit binary numbers are multiplied using the algorithm of FIG. 9.

The partial products formed by means of multiplying device mp form the rectangular partial-product field sp. An example of the arrangement of such a partial-product field for the partial products of two eight-digit binary numbers is shown in FIG. 10. The matrix array of the multiplexers mx in FIG. 11 corresponds to the rectangular partial-product field sp of FIG. 10. Each multiplexer mx provides at its output a binary signal p(Nz, Ns) which is permanently assigned to a single partial product of the rectangular partial-product field sp. This assignment does not change during a real and complex-number multiplication. What does change is the assignment at the input end.

Figure 12:
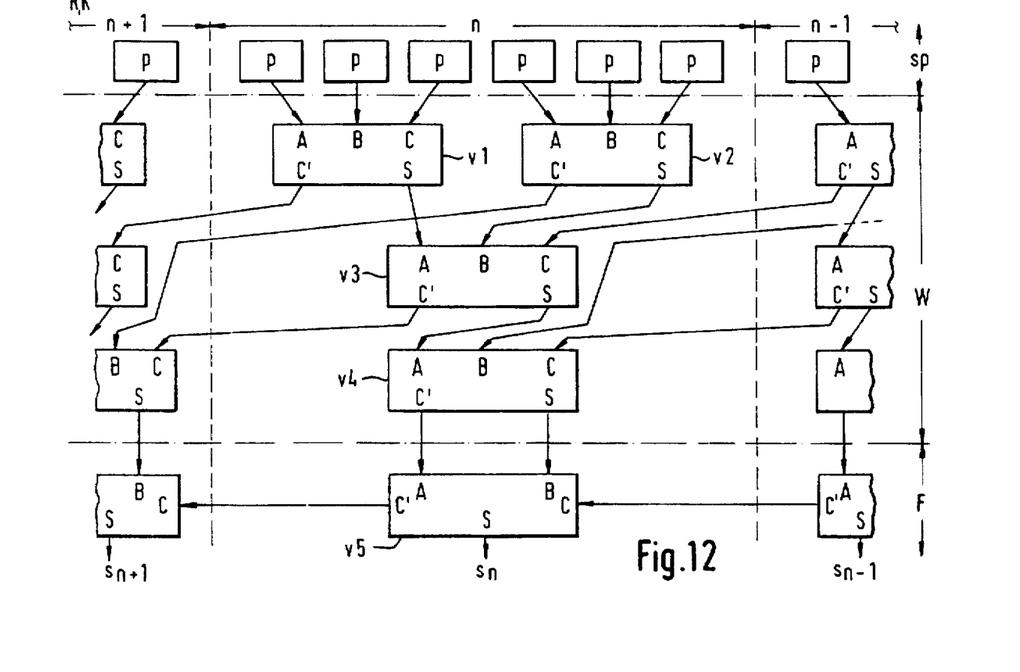
FIG. 12 shows schematically an adding-tree structure as an adding arrangement for the partial products.

All partial products of the rectangular partial-product field sp are fed to an adding arrangement ad in which the partial products of equal weight are added together. FIG. 12 shows a suitable adding-tree structure W which permits a parallel addition of the individual partial products. In the case of a complex-number multiplication, steps must be taken to ensure that no carry signal is transferred between the two halves of the adding arrangement ad. Connected to the adding arrangement is an output stage r3 which feeds a 4m-digit data output D3 from which the third number Z3 or the third complex number K3 is obtainable. The 4m-digit output stage r3 is split into two equally large ranges of digits, namely a fifth digit range S5 and a sixth digit range S6 with 2m digits each. In case of a complex-number multiplication with the subfields divided as shown in FIG. 5 or FIG. 6, the fifth digit range S5 provides the third imaginary number I3 and the sixth digit range S6 provides the third real number R3. The necessary switchovers in the adding arrangement ad are effected by means of the switching signal R, K.

Figure 9:
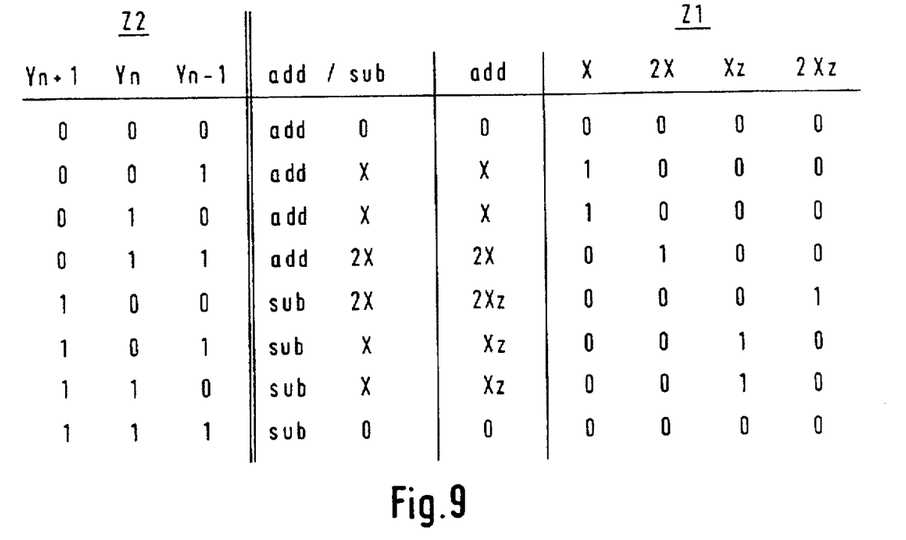
FIG. 9 shows in tabular form an example of a modified Booth's algorithm.

FIG. 9 shows in tabular form a rule for multiplying two multidigit binary numbers which is also known as "modified Booth's algorithm". A detailed description of this algorithm is contained in S. Waser and M. J. Flynn, "Introduction to Arithmetic for Digital Systems Designers," particularly on pages 132 to 135. In the right-hand, matrixlike column Z1 of FIG. 9, "1" designates the operation to be performed in order to obtain the respective partial-product row. "X" means that Z1 is taken as the partial-product row; "2X" means that Z1 is taken as the partial-product row with an arithmetic shift corresponding to the multiplication factor 2; "Xz" means that the two's complement of Z1 is taken as the partial-product row, and "2Xz" means that Z1 is to be multiplied by the factor 2 and the two's complement is to be formed therefrom. The formation of the two's complement may also take place before the shift function. The result is then taken as the partial-product row.

The second column from the right, "add", again specifies the operations of the right-hand column, implying that all partial-product rows have to be added. The third column from the right, "add/sub", represents in abbreviated form the operations to be performed if besides the add instruction, a subtract instruction is permissible for the individual partial-product rows. Then the two's complement formation can be dispensed with. The left-hand column, "Z2", specifies which digits $Y_0$ to $Y_{2m-1}$ of the second number Z2 have to be considered with respect to their bit value for the algorithm. The subscript "n" and the three values n+1, n, n−1 form a "window" which is placed over the second number Z2 for each partial-product row. In the case of the first partial-product row, n=1, which follows from the weight $2^0$ of the first digit of the number Z2. In the case of the second partial-product row, n=2, in the case of the third partial product row, n=4, in the case of the fourth, n=6, and so on up to n=2m−2 in the case of the last partial-product row. This is illustrated by an example with the aid of the tables of FIGS. 13 to 20. Since with this algorithm (see FIG. 9) the number of partial-product rows is halved, the individual partial-product rows in the partial-product field sp are shifted with respect to each other by two bit positions rather than one.

FIG. 10 shows schematically the arrangement of the individual partial products p(Nz,Ns) within the rectangular partial-product field sp. The spatial arrangement is defined by two numbers Nz, Ns. The first number Nz specifies the respective partial-product row, and the second, subscript number Ns specifies the respective position within the partial-product row. Both numbers Nz and Ns begin to run with the number 1.

If the Booth's algorithm of FIG. 9 is applied to two eight-digit binary numbers, i.e., 2m=8, then Nz runs from 1 to 4 and Ns runs from 1 to 16. Each of the four digit ranges S1 to S4 thus has m=4 digits. For the rectangular memory field sp, this gives 4m=16 digits horizontally, in the row direction. The corresponding resulting weights g are $2^0$ to $2^{4m-1}=2^{15}$.

FIG. 11 illustrates the formation of the individual partial products p(Nz, Ns) by means of multiplexers mx. The example relates to eight-digit real or complex input numbers which are to be multiplied using the Booth's algorithm of FIG. 9. Each multiplexer mx has nine data inputs and one data output. The data inputs are fed with different digits from the input stage r1 and/or with the bit value 1 or 0. The partial-product formation partially requires an inversion of the applied bit values. The easiest way to accomplish this is to provide inverting taps at the first input stage r1.

All multiplexers mx of a partial-product row are connected to four control lines of a multiplexer control d(Nz). The control lines are assigned the four control signals X, 2X, Xz, 2Xz, of FIG. 9. Each multicontrol is fed with three adjacent digits Yn+1, Yn, Yn−1 from the second input stage r2. The assignment of the control signals to the individual bit values is apparent from the table of FIG. 9.

In the first partial-product row, the data inputs of the first multiplexer control d1 are fed with the digits $Y_1$, $Y_0$ and Y−1 from the second input stage r2. Since Y−1 is less than the least significant bit of the second input number, this data input $Y_{-1}$ is connected to the bit value 0.

The second multiplexer d2 for the second partial-product row is fed with the digits $Y_3$, $Y_2$, and $Y_1$, the third multiplexer control d3 for the third partial-product row with the digits $Y_5$, $Y_4$, $Y_3$, and the fourth multiplexer control (not shown) for the fourth partial-product row with the digits Y7, Y6, Y5.

The operation of each multiplexer mx consists in the fact that by means of one of the four control signals X, 2X, Xz, 2Xz, one of four inputs is connected through to the output. An additional neutral position, i.e., if none of the control signals is present, switches the binary value 0 to the output. The designation of the four control instructions corresponds to the second column from the right in FIG. 9. The respective data input assigned to the neutral position in FIG. 11 is the ninth input in the middle of the multiplexer.

Switching from real to complex-number multiplication is effected by the switching signal R,K, which is applied to a further control input of each multiplexer. In FIG. 11 this is only shown for the third partial-product row to simplify the illustration. The switching signal R,K enables the four left-hand digits of the nine switching positions in the multiplexer mx to be activated in case of a real-number multiplication R, and the four right-hand digits in case of a complex-number multiplication K.

FIG. 11 only shows a portion of the whole multiplexer array. The assignment of data input to control input corresponds to the tables of FIGS. 13 to 20 in connection with the modified Booth's algorithm of FIG. 9. In each multiplexer half, the left-hand, i.e., first, data input is assigned to the control signal X, the second data input to the control signal Xz, and the fourth data input to the control signal 2Xz. The data input located exactly in the middle of each of the multiplexers mx is connected to the binary value 0. This neutral position applies to both real and complex-number multiplication. An example from FIG. 11, which relates to the first partial-product row and is also valid for the tables of FIGS. 13 and 14, will illustrate this. The multiplexer which forms the partial product $p1_9$ will be taken as an example. In case of a real-number multiplication R, its data inputs are connected in the above order to the following digits of the first number Z1: x7, x7, $\overline{x7}$, $\overline{x7}$. In case of a complex-number multiplication K, those data inputs are connected to the following digits of the first imaginary number I1 or the following values: $\overline{x0}$, 1, x0, 0. In case of a real-number multiplication R, the bits of the weights $2^1$ and $2^0$ of the second imaginary number I2 and with the bit value 0.

FIG. 12 shows schematically one embodiment of the adding arrangement ad, namely the above-mentioned adding-tree structure W for performing a parallel addition of the partial products. Only a portion of the complete adding arrangement ad is shown. In each column n, six partial products p have to be added. Such adding-tree structures are described in detail in the above-cited book by Kai Hwang, "Computer Arithmetic . . .", particularly on pages 100 to 103 in Section 4.3, "Multilevel Carry-Save Adders." Adding-tree structures are also known by the name of "Wallace Tree."

The circuit of FIG. 12 is composed of three parts. The first part corresponds to the rectangular partial-product field sp, which is present here in a linear array, with all partial products p of a column n combined in a linear group. The linear groups are arranged linearly according to weight. The second part is formed by the adding-tree structure W, which contains four full adders v1 to v4 for each partial-product group, which are coupled together and to full adders of the next less and next more significant column n−1, n+1. The third part is formed by a chain adder F with a fast, continuous overflow path. It is formed from cascaded full adders v5, with the sum outputs S providing the bit values $S_{n-1}$, $S_n$, $S_{n+1}$ for the respective bit positions n−1, n, n+1 of the output data word Z2, K3.

Each full adder v1 to v5 has two data inputs A, B and one overflow input C as well as one sum output S and one overflow output C'. The six partial products p of column n are fed to the inputs A, B, and C of the first and second full adders v1, v2. The overflow outputs C' of the first, second, and third full adders v1, v2, v3 are connected to the inputs of the next more significant adding tree n+1. The input C of the third full adder v3 and the inputs B and C of the fourth full adder v4 are connected to outputs of the next less significant adding tree n−1. The outputs C' and S of the fourth full adder are connected, respectively, to the inputs A and B of the fifth full adder v5. Within the column n, the output S of the first full adder v1 is connected to the input A of the third fuller adder v3. The output S of the latter feeds the input A of the fourth full adder v4, which has its outputs C' and S connected, respectively, to the inputs A and B of the fifth full adder v5. All stages of the claim adder F are cascaded via the output C' and input C for the transfer of the overflow signal from the preceding stage.

In case of a complex-number multiplication, all overflow movements between bit positions 2m and 2m+1 in the adding arrangement ad must be prevented. From this it follows that by means of electronic switching means controlled by the switching signal R,K, the overflow path must be opened at the appropriate bit positions in the adding-tree structure W and the chain adder F, and that instead, depending on the number system or the operation, the bit value 0 or 1 has to be inserted. This will be described in detail with reference to the tables of FIGS. 13 to 20.

In the adding arrangement ad, the switching signal R,K has a second function, since in the formation of all two's complements, a 1, the two's complement increment, has to be added in the respective least significant bit position. In the case of real-number multiplication R, these bit positions lie in the range from 1 to 2m, and in the case of a complex-number multiplication K, they lie in the two ranges from 1 to m and from 2m+1 to 3m, depending on whether the real number R1 or the imaginary number I1 is affected by the two's complement formation. In the adding-tree structure W of FIG. 12, the addition of the value 1 in the corresponding column is effected simply by feeding the number 1 to one of the inputs of the full adder v3 or v4, which should actually be connected to an overflow output C' of the next less significant column. This can be accomplished with an electronic transfer switch in the respective overflow path. Control is effected via the control signals Xz, 2Xz and the switching signal R,K. In the case of 2Xz, the two's complement increment in the case of 2Xz can also be added by connecting that data input of the respective multiplexer mx which is assigned to the control signal 2Xz to the number 1 instead of the number 0.

FIGS. 13 to 20 show in tabular form all partial products of the rectangular partial-product field sp, both in the case of a real-number multiplication R and in the case of a complex-number multiplication K. Since, in both cases, two eight-digit binary numbers have to be multiplied, and the algorithm of FIG. 9 is used, and with m=4, this gives sixteen digits and four partial-products rows for each type of multiplication.

Every two tables provide the values of a single partial-product row depending on the arithmetic operation R or K and the respective operation to be performed, X, 2X, Xz or 2Xz. This information is contained in a matrix like portion on the left-hand side of each table. The adjacent portion at the right contains the sixteen partial products p(Nz,Ns) belonging to the respective control signal. At the extreme right, any two's complement increment p(Nz,Ns,C), p(Nz, Ns,CH), p(Nz, Ns, CL) that may be necessary is given as "1". Ns indicates the bit position Ns of the partial-product row Nz in which the value 1 has to be added. "C" indicates that the two's complement increment is added in case of a real-number multiplication and relates to the entire partial-product row (Ns=1 to 4m). "CL" and "CH" indicate that the two's complement increment is added in case of a complex-number multiplication, with CL relating to the lower (Ns=1 to 2m) half of the partial-product row, and CH to the upper (Ns=2+1 4m) half.

The partial-product rows of FIGS. 14, 16, 18 and 20 contain the imaginary partial products of the third complex number K2 in the right-hand half (Ns=1 to 8), and the real partial products of the third complex number K3 in the left-hand half (Ns=9 to 16). The right-hand half of the rectangular partial-product field sp thus contains the third and fourth subfields T3, T4, and the left-hand half contains the first subfield T1 and the second subfield T2, which is to be negated. Between bit positions 8 and 9, the change of the subfields can be clearly seen.

Figure 13:
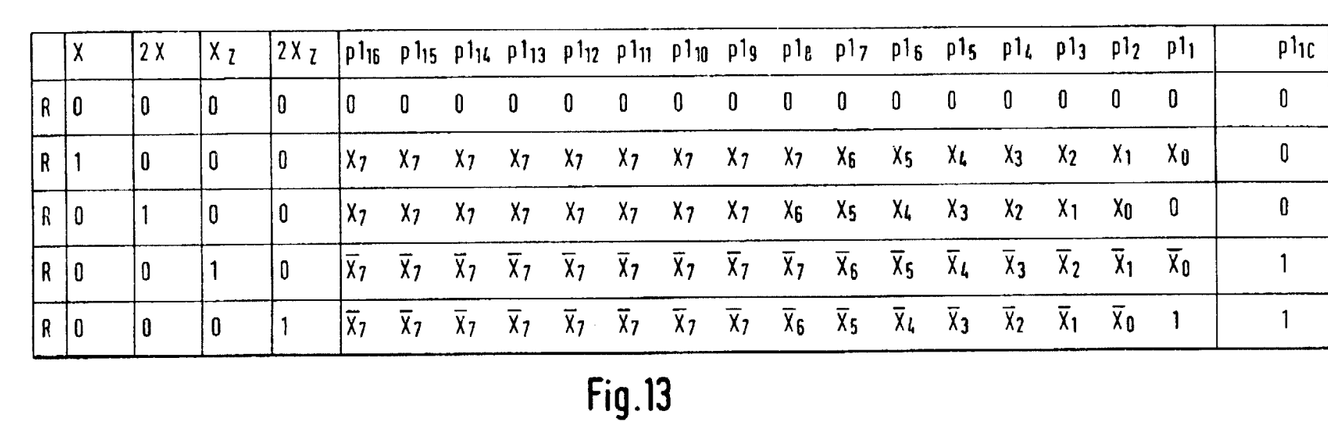
FIGS. 13 to 20 show in tabular form all partial products in real and complex-number multiplication by the example of two 8-digit input data, using the algorithm of FIG. 9.

In FIG. 13, the first row shows that none of the control signals is activated by the first multiplexer control d1. All multiplexers mx of the first partial-product row thus remain in the neutral position and provide the number 0 as a partial product. In the second row, the control signal X is activated. According to FIG. 9, therefore, all bit values of the first number Z1 have to be entered unchanged. Since this is the first partial-product row, the bit values are arranged in the rectangular partial-product field sp right-justified. The eight bit values x0 to x7 of the first number Z1 form the partial products $p1_1$ to $p1_8$. According to the two's complement number system, the partial products $p1_1$ to $p1_{16}$ are extended by the most significant bit value x7. To the left of $p1_8$, therefore, all partial products have the value x7. This is also referred to as "two's complement range extension by means of the most significant bit."

In the third row, in accordance with the control instruction 2X, all bits of the number Z1 are shifted one place to the left. The first bit position, which is assigned to the partial product $p1_1$, gets the value 0. The fourth row indicates that the two's complement Xz of Z1 has to be placed in the partial-product row. According to the two's complement number system, all bit values of the number Z1 have to be inverted, with the value 1 having to be added in the least significant bit position, here in the partial product $p1_1$. The range extension from Ns=9 is accomplished with x7. According to FIG. 12, the two's complement increment $p1_{1c}$ can be applied through a free overflow input of the full adders from column Ns=1. The fifth row shows the first partial-product row if the operation 2Xz is to be performed. This involves a multiplication of the number Z1 by the factor 2, i.e., a shift by one bit position, then an inversion of all bit values and an addition of the two's complement increment $p1_{1c}$ in bit position Ns=1. Through the shift, the associated multiplexer has become free, so that the two's complement increment can be fed directly to its fourth data input instead of a 0. The range extension from Ns=10 is accomplished with $\overline{x7}$.

Figure 14:
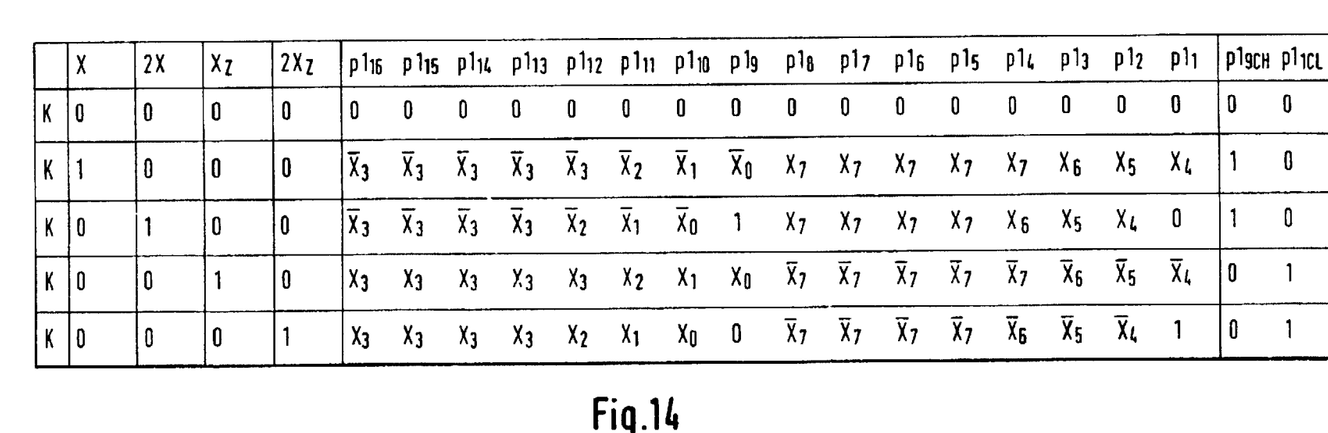

FIG. 14 shows the formation of the first partial-product row in case of a complex-number multiplication K. The first row symbolizes the neutral position. The second row is assigned to the operation X. For the bit values x0 to x3 in the left-hand half, which belong to the second subfield T2, which is to be negated, inversion must occur. The associated two's complement increment $p1_{9CH}$ has to be added in the ninth bit position. Range extension is accomplished with $\overline{x3}$. This negation is not indicated in the left-hand part of Table 14, which shows the Booth's algorithm of FIG. 9. The bit values x4 to x7 of the first complex number K1 are entered in bit positions 1 to 4 on the right-hand side. The range extension in bit positions 5 to 8 is accomplished with x7. No two's complement increment $p1_{CL}$ is added in the lower half CL.

The third row specifies the operation 2X. On the left-hand side, this operation must be performed with the bit values x0 to x3. To effect negation, the two's complement is then formed by inverting of the individual bit values and adding the two's complement supplement $p1_{CH}$. The value 1 can be entered directly in the ninth bit position. On the right-hand side, only the shift function of bit values x4 to x7 is performed. A 0 is added in bit position 1, and bit position 6 to 8 are extended by adding the MSB value x7. Range extension is accomplished on the left-hand side from Ns=14 with $\overline{x3}$.

The fourth row is determined by the two's complement operation Xz. Since the left-hand half shows partial products of the second subfield T2, these have to be negated twice—this, however, corresponds to the bit values of the imaginary number I1. Of the bit values x4 to x7 in the right-hand half, the two's complement has to be formed. Accordingly, these digits have to be inverted, and a two's complement increment $p1_{1CL}$ has to be added in bit position 1, e.g., via a free overflow input. Bit positions 5 to 8 have to be extended by adding the MSB value $\overline{x7}$.

The fifth row, which is assigned to the operation 2Xz, designates a shift operation and a two's complement formation. Since the left-hand side relates to the second subfield T2, which is to be negated, the two's complement must be formed once again for this. A double two's complement formation results in the original bit values, of course. Thus, the bit values x0 to x3 of the first complex number K1 are entered unchanged in bit positions 10 to 13 in the left-hand half. The free, ninth position must be filled with 0. On the right-hand side, only the shift function and the two's complement formation have to be performed. Therefore, the bit values x4 to x7 are inverted with respect to the first real number R1, and the value 1 stands as two's complement increment $p1_{CL}$ in bit position Ns=1.

Figure 15:
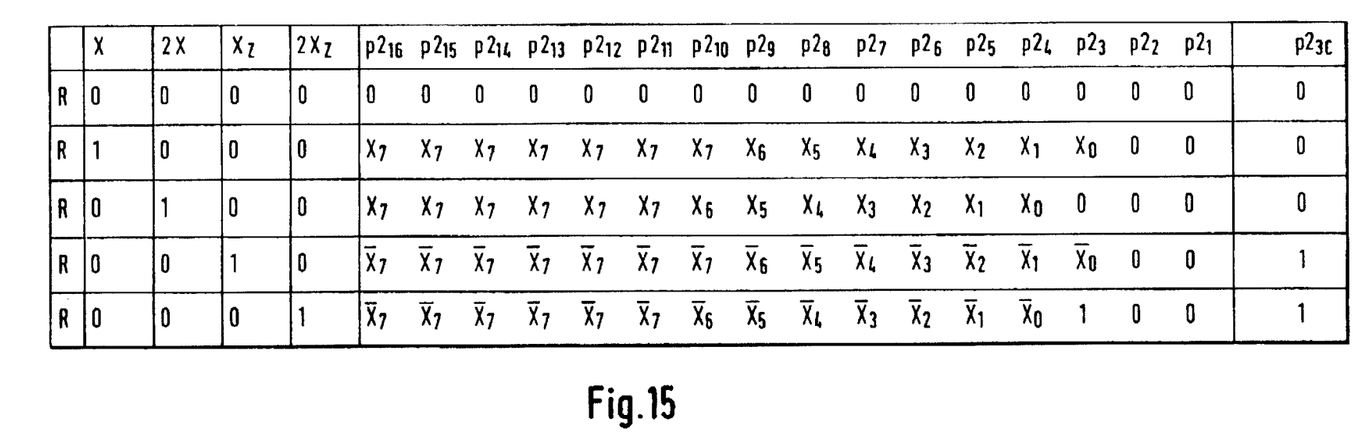
Figure 16:
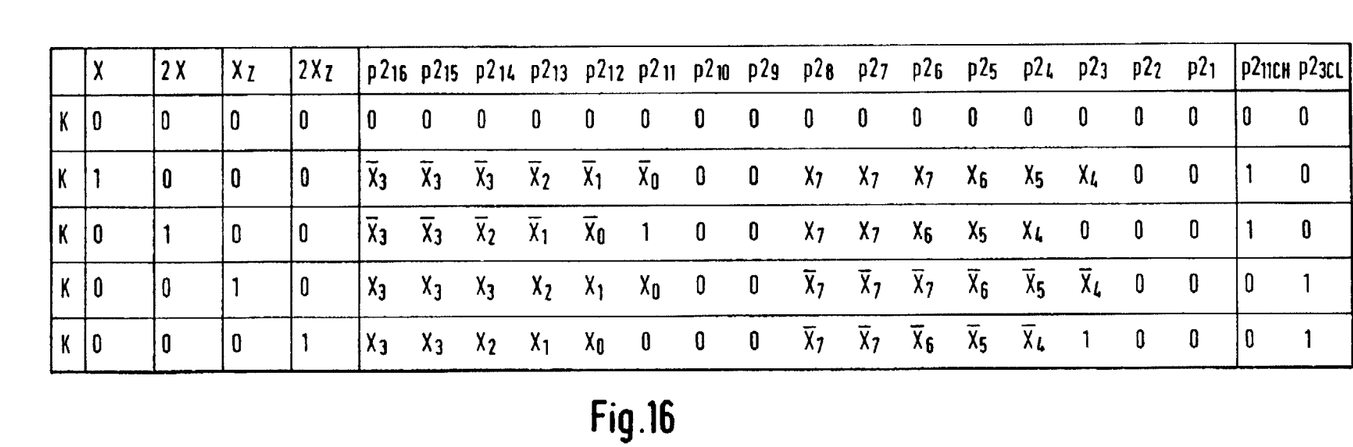

FIGS. 15 and 16 are tables for the second partial-product row in case of a real-number multiplication R and a complex-number multiplication K, respectively. Unlike in the tables of FIGS. 13 and 14, for the second partial-product row, the reference digit for the two's complement increment in case of a real-number multiplication is the bit position Ns=3, and the reference digits in case of a complex-number multiplication K are the bit positions Ns=3 and Ns=11. This also follows from the trapezoidal arrangement of the subfields T2, T3 and from the reduction of the partial-product rows as a result of the modified Booth's algorithm. The necessary, right-justified range extensions are accomplished with the value 0 in bit positions 1 and 2 in the case of a real-number multiplication, and in the CL bit positions 1 and 2 as well as the CH bit positions 9 and 10 in case of a complex-number multiplication. In the table of FIG. 16, too, an additional two's complement formation takes place in the left-hand half because of the second subfield T2, which must be negated. This, like in FIG. 14, results in a double two's complement formation in rows 4 and 5, whereby the unchanged bit values x0 to x3 of the first imaginary number I1 are entered in bit positions 11 to 14 in row 4 and, as a result of the shift, in bit positions 12 to 15 in row 5.

Figure 17:
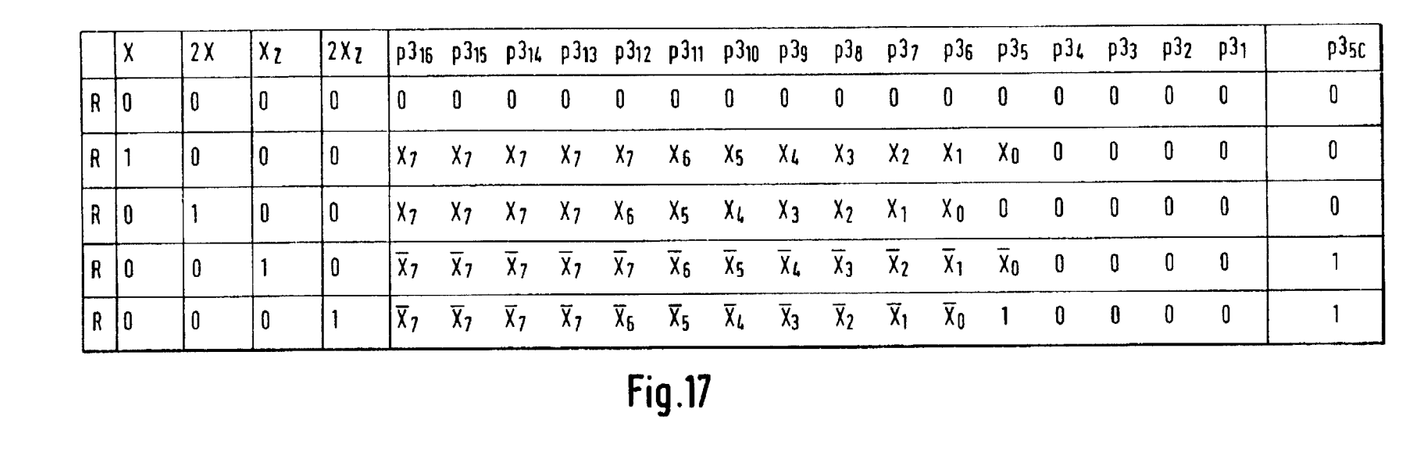
Figure 18:
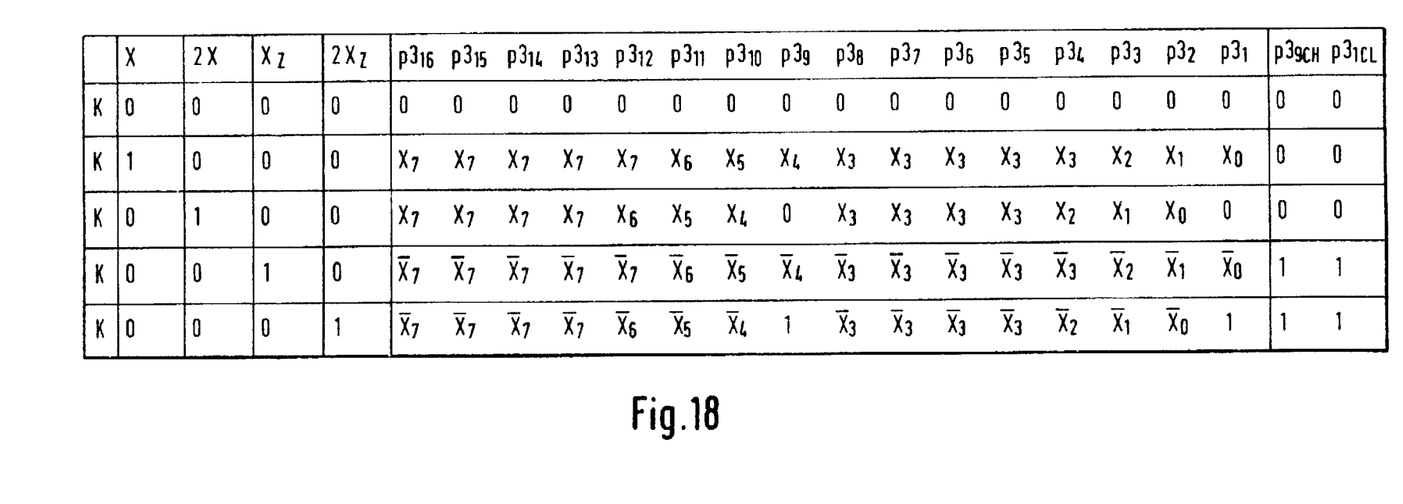

FIGS. 17 and 18 show the formation of the third partial-product row, whose reference bit position for the two's complement increment is Ns=5 in case of a real-number multiplication R. The reference bit positions for the two's complement increment in case of complex-number multiplication K, which relate to the first and fourth subfields T1, T4, are Ns=9 and Ns=1. Here, no double two's complement formation takes place.

Figure 19:
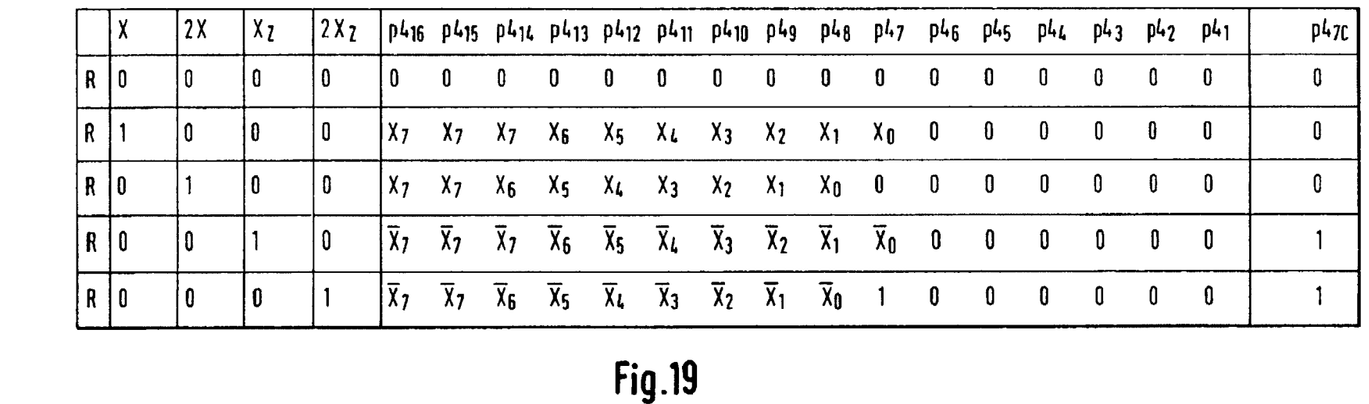
Figure 20:
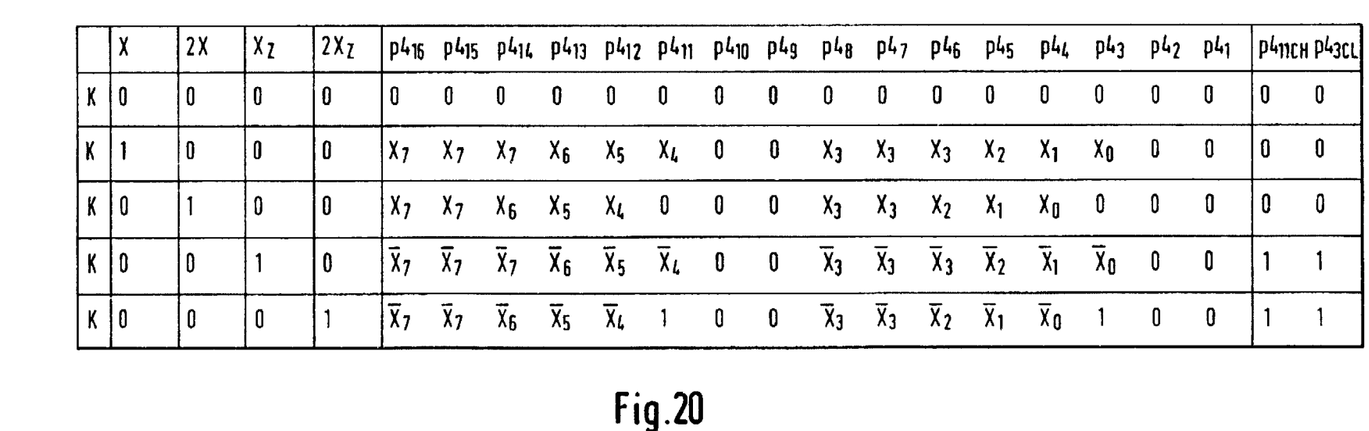

FIGS. 19 and 20 provide the tables for the fourth partial-product row. The fourth partial-product row is assigned to the first and fourth subfields T1, T4. In case of a real-number multiplication R, the reference bit position for the two's complement increment is Ns=7. In case of a complex-number multiplication K, the reference bit positions for the two's complement increment are Ns=11 on the left-hand side and Ns=3 on the right-hand side. In the fourth partial-product row, no double two's complement formation takes place.

The example of the formation of partial products with m=4, which is illustrated in the tables of FIGS. 13 to 20, can readily be applied to the above-mentioned multiplier for 20-digit numbers, with m=10, or to multipliers with a different number of digits. Furthermore, the invention allows the real-number/complex-number systems and other algorithms for the formation of partial products.

It will be understood that the present invention apparatus and method for multiplying real and complex number devices as described herein is merely exemplary and that a person skilled in the art may make many variations and modifications to the described embodiments utilizing functionally equivalent circuitry and method steps to those described. As such, variations and modifications, to the circuitry and method stages presented are intended to be the scope of the invention as described in the appended claims.

What is claimed is:

1. A multiplier for multiplying real numbers and complex numbers, said multiplier adapted to accept a first and second 2m-digit number, wherein m is a number greater than or equal to 1, where a real number and a complex number are each split into a first and second digit range corresponding to said first and said second digit 2m numbers where the real part of a complex is represented by said first digit range, said multiplier comprising:

multiplication means for forming partial products of said first and second 2m-digit number, said multiplication means having a first data input for receiving a first digit number and a second data input for receiving a second digit number, wherein said multiplication means is operable such that, for said complex number, a set of said partial products are formed as negated values;

partial product field means included in said multiplication means for arranging and storing said partial products, said partial product field means including a matrix array of multiplexers, wherein each of said multiplexers has data inputs and control inputs selectively coupled to predetermined digits of said first and second data inputs, wherein each partial product is fixedly coupled to a multiplexer whose data output provides the respective partial product;

adding means coupled to said partial product field means for adding said partial products of said partial product field means in a positionally correct manner;

controller means coupled to said multiplication means and said adding means for selectively switching said multiplication means and adding means between real number multiplication and complex number multiplication based on the number applied to said first and second data inputs;

output means for providing 4m-digit output which is the product of said first and second 2m-digit numbers.

2. The multiplier of claim 1, further including a first and second input stage coupled to said first and second data inputs, respectively, said first data input stage being operable to split said first 2m-digit number into first and second digit ranges, and said second data input stage operable to split said second 2m-digit number into third and fourth digit ranges.

3. The multiplier of claim 2, wherein said multiplication means includes means for forming a first subfield from the partial product of said second and fourth digit ranges, a second subfield from the partial product of said first and third digit ranges, a third subfield from the partial product of said second and third digit ranges and a fourth subfield from the partial product of said first and fourth digit ranges.

4. The multiplier of claim 3, where in the case of real number multiplication, said first and third digit ranges include digits 1 to m of said first and second numbers, respectively, and said second and fourth digit ranges include digits m+1 to 2m of said first and second number, respectively, said controller means including means to cause a first basic weight to be assigned to said first subfield, a second basic weight to be assigned to said third and fourth subfield, and a third basic weight to be assigned to said second subfield, enabling the addition of said partial products of said first, second, third and fourth subfields to be performed in positionally correct manner in said adding means thereby providing said 4m digit output in accordance with a resulting weight of individual partial products.

5. The multiplier of claim 4, where in the case of complex number multiplication, said first and third digit ranges include m imaginary number digits of said first and second numbers, respectively, and said second and fourth digit ranges include m real number of said first and second numbers, respectively, said controller being operable to cause a fourth basic weight to be assigned to said first and second subfield, and a fifth basic weight to be assigned to said third and fourth subfield, said multiplication means being operable to cause said set of partial products of said second subfield to be formed as negated values, whereby in accordance with a resulting weight, said adding means is operable to add said negated values of said second subfield to said first subfield and to separately add said first and second subfields in a positionally correct manner to thereby provide 2m digits of the real part and 2m digits of the imaginary part of said 4m digit output of a complex number.

6. The multiplier of claim 5, wherein the arrangement of partial products in said partial product field is rectangular and comprises 4m digits in a row direction and 2m or less digits in a column direction, the positions of subfields in said partial product field being determined by said first through fifth basic weights.

7. The multiplier of claim 6, wherein said first basic weight has a value of $2_{2m}$, said second basic weight has a value $2^m$, said third basic weight has a value of $2^0$, said fourth basic weight has a value of $2^{2m}$ and said fifth basic weight has a value of $2^0$.

8. The multiplier of claim 6, wherein said partial products are formed by means of a Booth's algorithm.

9. The multiplier of claim 1, wherein said partial products formed by said multiplication means are defined as subfields, said controller means including means for assigning basic weights to said subfields, said basic weights corresponding to a predetermined arithmetic shift of a group of said partial products.

10. The multiplier of claim 1, further including an output stage coupled between said adding means and said output means, said output stage providing two ranges of digits and being operable to feed a 4m-digit to said output means.

11. The multiplier of claim 1, wherein the data inputs of said multiplexers are partially inverted.

12. The multiplier of claim 1, wherein said adding means is operable by means of an adding tree structure, thereby performing positionally correct addition of said partial products.

13. The multiplier of claim 1, wherein each of said multiplexers includes a neutral input position, wherein if none of said control inputs are present, said neutral position is switched to said output.

14. A method for multiplying real and complex numbers by means of a multiplier apparatus, said real and complex numbers being characterized as 2m digit numbers, wherein m is a number greater than or equal to 1, said method comprising the steps of:

splitting a first 2m digit number into first and second digit ranges and splitting said second 2m digit number into third and fourth digit ranges;

selectively switching between real number multiplication and complex number multiplication;

forming partial products as a result of multiplying individual digits of said 2m digit numbers, wherein for complex numbers, a set of partial products are formed as negated values, wherein multiple predefined partial products are defined as subfields;

assigning basic weights to said subfields, wherein said basic weights correspond to a predetermined arithmetic shift of a group of said partial products;

arranging said partial products in a partial product field means;

providing a matrix array of multiplexers in said partial product field means, wherein each of said multiplexers has data inputs and control inputs selectively coupled to predetermined digits of first and second data input stages, and assigning to each partial product a multiplexer whose data output provides the respective partial product;

adding said partial products of said partial product field means in a positionally correct manner according to said basic weights to produce a 4m digit number.

15. The method of claim 14, further including the step of forming a first subfield from the partial product of said second and fourth digit ranges, a second subfield from the partial product of said first and third digit ranges, a third subfield from the partial product of said second and third digit ranges and a fourth subfield from the partial product of said first and fourth digit ranges.

16. The method of claim 15, where in the case of real number multiplication, said first and third digit ranges include digits 1 to m of said first and second numbers, respectively, and said second and fourth digit ranges include digits m+1 to 2m of said first and second number, respectively, said method further including the steps of assigning a first basic weight to said first subfield, a second basic weight to said third and fourth subfield, and a third basic weight to said second subfield, and adding said partial products of said first, second, third and fourth subfields in a positionally correct manner, thereby providing said 4m digit output in accordance with a resulting weight of individual partial products.

17. The method of claim 16, where in the case of complex number multiplication, said first and third digit ranges include m imaginary number digits of said first and second numbers, respectively, and said second and fourth digit ranges include m real number digits of said first and second numbers, respectively, said method including the steps of assigning a fourth basic weight to said first and second subfield, and a fifth basic weight to said third and fourth subfield, and forming said set of partial products of said second subfield as negated values, whereby in accordance with a resulting weight, said negated values of said second subfield are added to said first subfield and said first and second subfields are added to thereby provide 2m digits of the real part and 2m digits of the imaginary part of said 4m digit output of a complex number.

18. The method of claim 17, further including the step of arranging said partial products in said partial product field in selected positions in a rectangular fashion comprising 4m digits in a row direction and 2m or less digits in a column direction, said positions of subfields in said partial product field being determined by said first through fifth basic weights.

19. The method of claim 18, further including the step of forming said partial products by means of a Booth's algorithm.

20. The method of claim 17, wherein said first basic weight has a value of $2^{2m}$, said second basic weight has a value $2^m$, said third basic weight has a value of $2^0$, said fourth basic weight has a value of $2^{2m}$ and said fifth basic weight has a value of $2^0$.

21. The method of claim 17, including the step of performing said positionally correct addition of said partial products in an adding means by means of an adding tree structure.

22. The method of claim 14, wherein said steps of selectively switching and assigning basic weights are accomplished by means of a controller.

* * * * *